Figures 1, 1A:
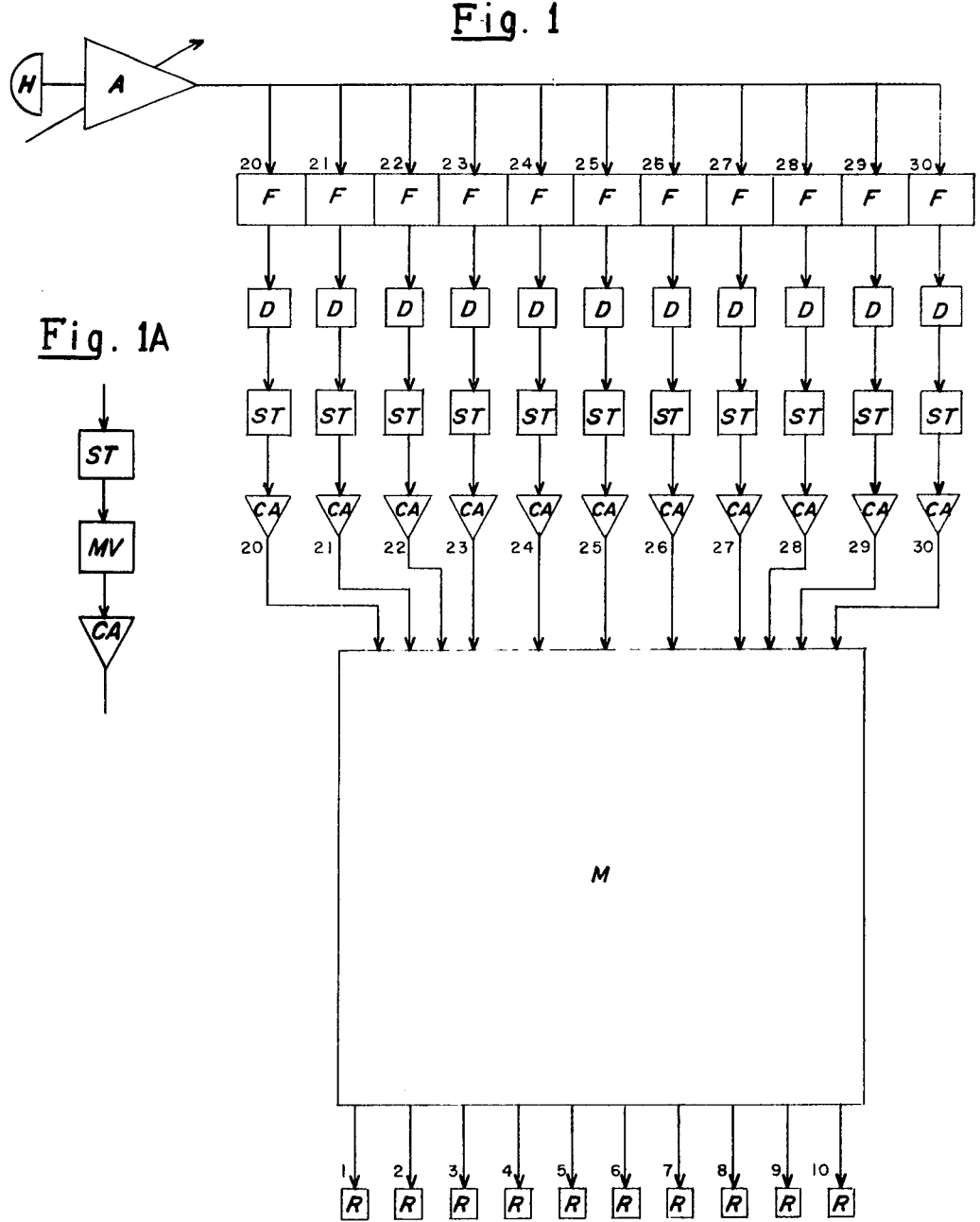

United States Patent
Bowyer et al.

[15] 3,660,808
[45] May 2, 1972

[54] ASSEMBLY FOR RECOGNIZING UNDERWATER ACOUSTIC SIGNALS

[72] Inventors: Kern M. Bowyer, Wilmington; David L. Coursen, Newark, both of Del.

[73] Assignee: E. I. du Pont de Nemours and Company, Wilmington, Del.

[22] Filed: Aug. 24, 1962

[21] Appl. No.: 219,342

[52] U.S. Cl. ................................340/5 R, 181/0.5 A, 340/6 R
[51] Int. Cl. ...........................................................G01s 3/00
[58] Field of Search ...............................325/323–326, 333, 325/452; 328/133; 340/3, 5, 6, 15, 15.5, 16; 343/17.2, 113, 113.2; 181/.5, .5 A, 53, 53 B Primary Examiner—Richard A. Farley
Attorney—Samuel S. Blight

EXEMPLARY CLAIM

1. An assembly for determining and indicating the difference between the periods of a pair of pressure pulse sequences received by a pressure pulse receiver situated in the ocean at a location non-normal to a longitudinal array of spaced explosive elements detonated in the ocean in a manner such as to form two parallel detonation trains travelling in opposite directions relative to each other, the period of each pressure pulse sequence received at any angle from said array varying according to said angle and being the same at a normal angle to said array, the periods of pressure pulse sequences expected to be received at different angles from said array being known, and the difference between periods of a pair of pressure pulse sequences received at any angle from said array being equal to $2(d/C)\cos\phi$ where d is the distance between explosive elements in said array, C is the speed of sound in water, and $\phi$ is the angle between the receiver and the longitudinal axis of said array, which assembly comprises a. a pressure transducer;

b. an amplifier with automatic gain control coupled to said pressure transducer;

c. a frequency separator coupled to said amplifier and having n frequency-band elements each of which passes a narrow band of frequencies, said frequency-band elements collectively passing all frequencies expected at all angles from said array and being so arranged that their center frequencies provide equal period increments $\Delta t$ between successive frequency band elements, the period corresponding to the lowest center frequency being T, and the periods corresponding to the successively higher center frequencies of successive elements being $T-\Delta t$, $T-2\Delta t$, $T-(n-1)\Delta t$;

d. an integrating device coupled to each of said frequency-band elements;

e. a triggering device coupled to each integrating detector;

f. a sorting circuit coupled to said triggering devices, said sorting circuit having a plurality of conductors for carrying an output signal therefrom when signals are received from at least two different triggering devices, the number of said conductors being equal to the number n of said frequency-band elements in said frequency separator less one, one of said conductors carrying an output signal when the signals received are from two different frequency-band elements whose center frequencies correspond to periods which differ from each other by $\Delta t$, another by $2\Delta t$, etc. through $(n-1)\Delta t$;

g. a multi-response circuit having $(n-1)$ response mechanisms each coupled to one output conductor from said sorting circuit, wherein n is as defined above.

4 Claims, 4 Drawing Figures

INVENTORS
KERN M. BOWYER
DAVID L. COURSEN
BY John H. Tregoning

ASSEMBLY FOR RECOGNIZING UNDERWATER ACOUSTIC SIGNALS

This invention relates to an assembly for determining the difference between the periods of two pressure pulse sequences.

Recently, a need has arisen for acoustic sources which emit a coded acoustic signal and are effective underwater for purposes of communication between a submerged vessel and an air- or surface-craft. In answer to this need, an explosive sound source emitting pressure pulse sequences of controllable period characteristics has been developed. This source is a longitudinal assembly of spaced explosive elements connected in sequence by a detonation-transmitting means. The assembly is initiated at the center or two ends thereof, thereby forming two arrays of successively detonating elements, i.e., two different parallel detonation trains travelling in opposite directions relative to each other. Each explosive element is the center of a pressure front or pulse. Since these centers are axially displaced from each other in the arrays, each array is a Doppler sound source, i.e., the time interval between the arrival of successive pulses from each array at a specified receiving point, or the period of the pulse sequence from each array, varies according to the angle between the receiver and the longitudinal axis of the assembly. However, the geometry of the explosives assembly is such that the sum of the periods of the two pressure pulse sequences is independent of the angle of observation, and, at any angle from the assembly, is twice the period of the pulse sequence emanating in a normal direction from either array, this normal period being the same for the two arrays. The period of the pulse sequence emanating normal from the arrays as well as at other angles therefrom is determined by the distance between explosive elements and the time required for the detonation to be transmitted between elements and therefore is a controllable factor. Consequently, the described assembly produces pulse sequences which, by virtue of having a predetermined combined frequency characteristic independent of the location of their reception point relative to their emission point, can be used to great advantage as a code or signal together with suitable identifying means in underwater operations.

A modification of the coded explosive sound source is one in which from said array being equal to $2(d/C)\cos \phi$, where $d$ is the distance between said explosive elements in said array, $C$ is the speed of sound in water, and $\phi$ is the angle between the receiver and the longitudinal axis of said array, can be determined and indicated by an assembly which comprises (a) a pressure transducer adapted to receive the pressure pulses and convert them into electrical impulses; (b) an amplifier with automatic gain control coupled to said pressure transducer; (c) a frequency separator adapted to separate the electrical impulse signals into various frequency components, said frequency separator being coupled to said amplifier and having $n$ frequency-band elements each of which passes a narrow band of frequencies, said frequency-band elements collectively passing all frequencies expected at all angles from said array and being so arranged that their center frequencies provide equal period increments $\Delta t$ between successive elements, the period corresponding to the lowest center frequency being $T$, and the periods corresponding to the successively higher center frequencies of successive elements being $T-\Delta t$, $T-2\Delta t$, ... $T-(n-1)\Delta t$; (d) an integrating detector coupled to each frequency-band element of said frequency separator, said integrating detector being adapted to the AC signal from said element into a DC signal; (e) a triggering device coupled to each integrating detector, said triggering device being adapted to produce an output signal only when the input signal thereto attains a preset level above the ambient noise level of the ocean; (f) a sorting circuit coupled to said triggering devices, said sorting circuit having a plurality of conductors adapted to carry an output signal therefrom when signals are received from at least two different frequency-band elements in said frequency separator, the number of said conductors being equal to the number $n$ of said frequency-band elements in said frequency separator less one, one of said conductors carrying an output signal when the signals received are from two frequency-band elements whose center frequencies correspond to periods which differ from each other by $\Delta t$, another by $2\Delta t$, etc., through $(n-1)\Delta t$; and (g) a multi-response circuit having $(n-1)$ response mechanisms each coupled to one output conductor from said sorting circuit, wherein $n$ is as defined above, an electrical impulse signal in any one of said conductors actuating a separate response mechanism, each response mechanism being appropriately labelled to identify the output conductor from said sorting circuit with which the response mechanism is associated.

In a preferred embodiment of the assembly of this invention, the sorting circuit, i.e., a circuit which sorts the signals according to the combined characteristics of their periods, comprises a core matrix and core-driving amplifiers, each core-driving amplifier being coupled (1) to one triggering device and (2) to the core matrix, one row (X coordinate) and one column (Y coordinate) of said matrix being constructed of a conductor from each of the core-driving amplifiers. The matrix has a saturable toroidal core at each intersection of the conductors forming the columns and rows with the exception of the intersections of conductors leading out of the same core-driving amplifier. The matrix is "set" when current passes through intersecting conductors and reverses the magnetic state or saturation of one or more cores. The "set" matrix is "reset" by application of a current to a conductor which links all of the cores in the matrix in the same direction. To carry an output pulse from the matrix, a plurality of labelled conductors are provided, each labelled conductor passing through all of the cores located at the intersection of the two conductors from two core-driving amplifiers on the same channels as two frequency-band elements whose center frequencies correspond to periods having the same difference between them. Resetting of any set cores around any of these output conductors causes current to flow from them to the response circuit.

The assembly of this invention can also be used to give a direct indication of the angle, $\phi$, between a pressure pulse receiver and the longitudinal axis of the explosives assembly. Since the periods of the pressure pulse sequences expected at any angle from said assembly are known from the geometry of the assembly and the nature of the explosive, and since the difference between the periods of a pair of pressure pulse sequences received at any angle from said assembly is equal to $2(d/C)\cos \phi$, $\phi$ can be calculated for all possible differences in periods, i.e., for $\Delta t$, $2\Delta t$, ... $(n-1)\Delta t$, corresponding to the center frequencies of the filter-band elements, these the described two-array assembly of explosive elements is used in combination with one or more single-array assemblies of spaced explosive elements, the two-array assembly emitting a pair of pressure pulse sequences the sum of whose periods is independent of the angle of observation, and the single-array assembly emitting a pressure pulse sequence whose period depends on the angle of observation. Therefore, for a message encoded in such a source to be recognizable, it is necessary that the angle between the observer and the longitudinal axis of the single-array assembly be known. As will be shown hereinafter, the angle between an observation point and the longitudinal axis of the two-array assembly described above is a function of (a) the difference between the periods of the two pressure pulse sequences received at said angle, (b) the distance between the explosive elements in the arrays, and (c) the speed of sound in the surrounding medium. The last two parameters being known, it follows that a means of determining the difference between periods of a pair of pressure pulse sequences received at a certain location from the two-array assembly will permit a fixing of the angle between the assembly and the reception point. Once this angle is known, the period of the single sequence(s) received at this reception point from one or more single-array assemblies detonated after the two-array assembly, can be recognized as the correct one from a knowledge of (1) the period expected from each array at different angles, and (2) the angle, if any, between the axis of each single-array assembly and the axis of the two-array assembly.

It now has been found that the difference between the periods of a pair of pressure pulse sequences received by a pressure pulse receiver situated in the ocean at a location non-normal to a longitudinal array of spaced explosive elements detonated in the ocean in a manner such as to form two parallel detonation trains travelling in opposite directions relative to each other, the period of each pressure pulse sequence received at any angle from said array varying according to said angle and being the same at a normal angle to said array, the periods of pressure pulse sequences expected to be received at different angles from said array being known, and the difference between periods of a pair of pressure pulse sequences received at any angle frequencies collectively comprising those expected at all angles from the explosives assembly. By appropriately labelling the response mechanisms associated with the output conductors from the sorting circuit, the angle $\phi$ calculated for $\Delta t, 2\Delta t, ... (n-1)\Delta t$ can be observed directly.

Figure 2:
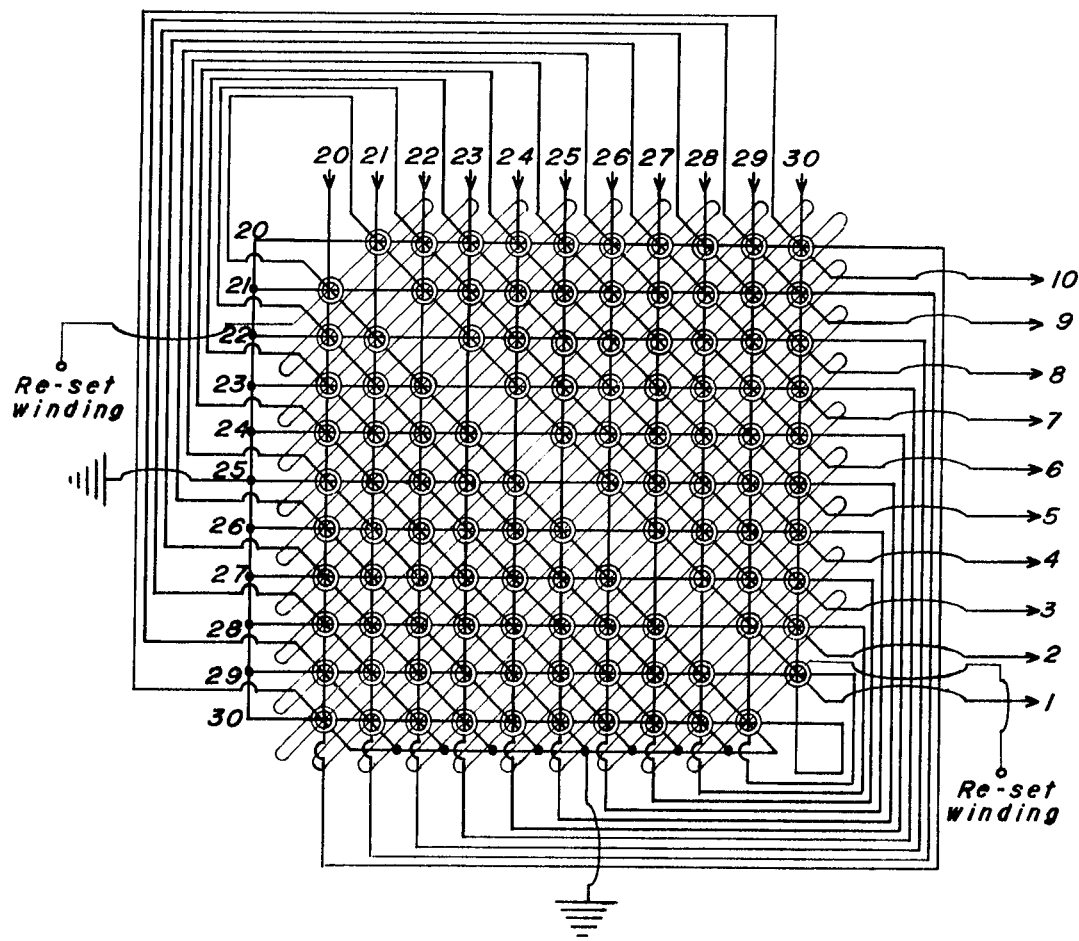
Figure 3:
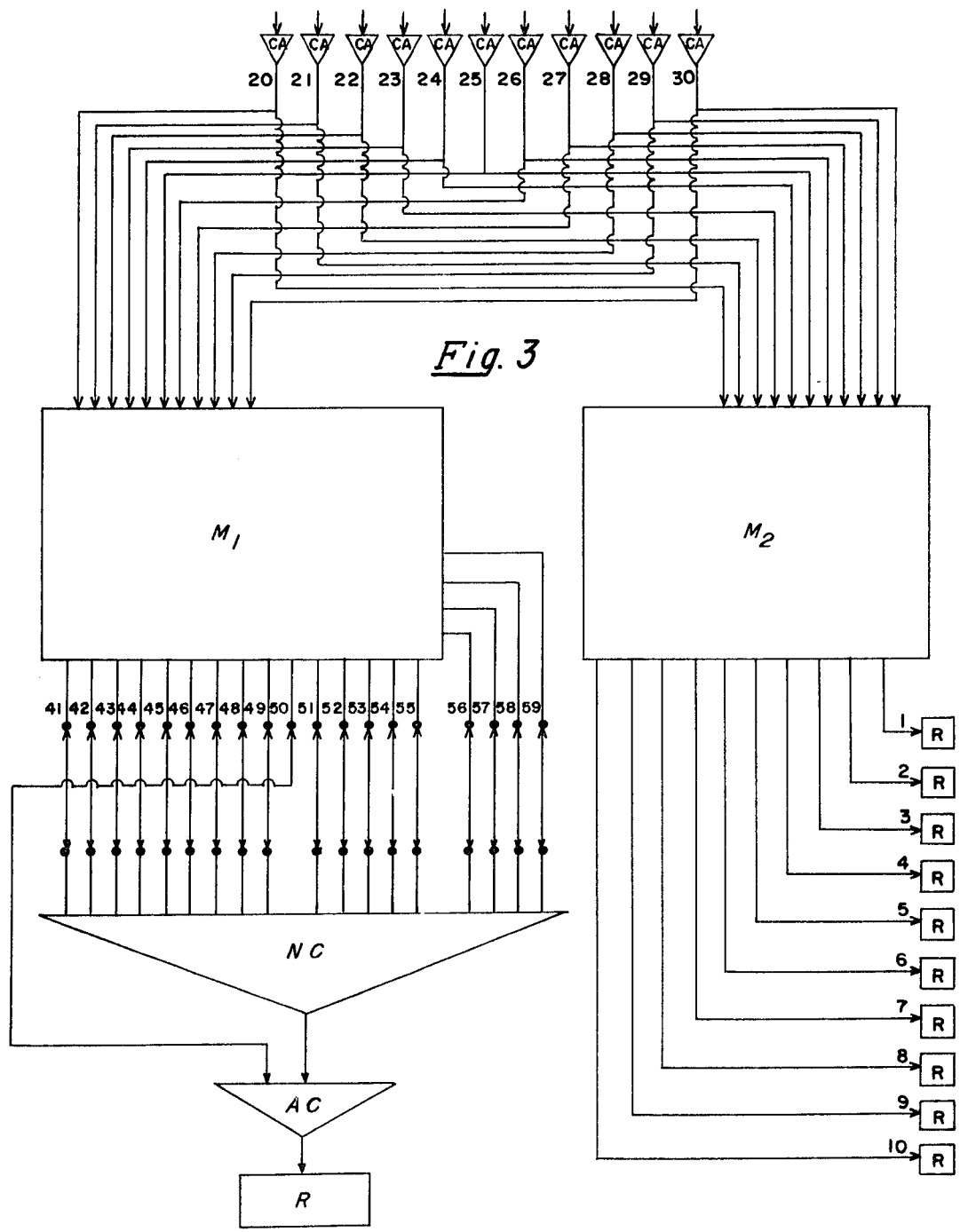

In order to describe the invention more fully, reference is now made to the accompanying drawings in which FIG. 1 is a block diagram of the present assembly, FIG. 1-A illustrates a modification of the assembly of FIG. 1, FIG. 2 is a schematic drawing of one element of the assembly, i.e., a core matrix, and FIG. 3 is a block diagram of a portion of an assembly for (1) automatically detecting a pair of pressure pulse sequences the sum of whose periods is known and (2) determining the difference between the periods of the pulse sequences.

Referring now to the drawings in greater detail, in FIG. 1 the pressure transducer is a hydrophone, H; A is an amplifier with automatic gain control; the frequency separator is a comb filter bank comprised of eleven filters denoted by F and numbered 20 through 30, each filter passing a narrow band of frequencies and all eleven filters collectively passing all frequencies expected at all angles from the explosives array emitting the pressure pulse sequences to be sorted, the eleven filters being so arranged that their center frequencies provide equal period increments, $\Delta t$, between successive filters; D represents an integrating detector coupled to each filter F and rectifying the AC signal put out by the filter; the triggering device is a Schmitt trigger ST coupled to each integrating detector and producing an output signal only when the input level thereto exceeds its pre-set level; the core-driving amplifier CA coupled to each Schmitt trigger adjusts the signal level so as to apply a "one-half current" level to the core matrix M, i.e., the current level from any one core-driving amplifier to the matrix is half that required to reverse the magnetic state of a core; the eleven input lines into the core matrix are numbered 20 through 30, corresponding to the number of the filter on the same channel as the core-driving amplifier from which the line leads; the ten output lines from the matrix are numbered 1 through 10. In the multi-response circuit, R represents a response mechanism, of which there are ten, each response mechanism being actuated by a signal on one of said ten output lines from the matrix.

If the two pulse sequences to be detected are produced non-simultaneously, the assembly of FIG. 1 will be modified by inserting an astable multi-vibrator MV between each Schmitt trigger and core-driving amplifier in the manner shown in FIG. 1-A. The multi-vibrators will lengthen the signals from the Schmitt triggers and allow the extended pulse sequences to go through the amplifiers for a pre-set length of time, such that the pulse from a subsequent sequence will pass through its amplifier while the extended pulse from the first sequence is going through its amplifier.

The core matrix shown schematically in FIG. 2 is comprised of eleven essentially parallel conductors arranged perpendicular to and intersecting eleven essentially parallel conductors, the number of conductors in each parallel group being equal to the number of filters in the comb filter bank shown in FIG. 1. A conductor from each core-driving amplifier forms one row and one column of the matrix, the conductors forming said row and column being numbered the same as the filter on the same channel as the core-driving amplifier from which the conductor leads. That is, the columns (Y coordinates) of the matrix are numbered 20 through 30, and the rows (X coordinates) are numbered 20 through 30, conductors having the same number originating from the same core-driving amplifier on the same channel as a filter having the said number. The matrix has a saturable toroidal core at each intersection of the conductors forming the columns and rows with the exception of those intersections located on a diagonal line from the top left to the bottom right of the matrix, i.e., the intersections of two conductors originating from the same core-driving amplifier. A conductor linking all of the cores in the matrix in the same direction as shown in FIG. 2 constitutes a read-out command winding which is used to "reset" any "set" cores in the matrix. This winding is pulsed periodically by some suitable means (not shown), e.g., by a free-running clock and driver mechanism. All of the cores located at the intersection of two conductors whose numbers differ from one another by the same number have a separate conductor, i.e., a readout winding, passing through them. That is, a separate output conductor passes through all of the cores located at the intersection of two conductors whose numbers differ by 1, 2, 3, 4...10. The read-out windings on the core matrix are the lines numbered 1 through 10. The latter are connected to the response mechanisms shown in FIG. 1. It will be understood that all conductors intersect, but are not electrically connected, in the cores.

The assembly shown in FIG. 3 is the same as that shown in FIG. 1 up to the core-driving amplifiers CA. That is, it will be understood that the assembly of FIG. 3 has a hydrophone, amplifier, filter bank, detectors, and Schmitt triggers, the latter coupled to the core-driving amplifiers. In FIG. 3, each core-driving amplifier applies a "one-half current" level to two core matrices $M_1$ and $M_2$. One core matrix, $M_2$, is that shown in FIG. 2, i.e., the matrix has $(n-1)$ output conductors and associated response mechanisms. The other core matrix, $M_1$, is one which is part of an assembly which has been developed recently to automatically detect two pressure pulse sequences produced by the explosives assembly described above. $M_1$ has $(2n-3)$ output conductors numbered 41 through 59, each passing through all of the cores located at the intersection of two conductors from two core-driving amplifiers on the same channel as two filters whose center frequencies correspond to periods which add up to the same sum. In all other respects, $M_1$ is constructed similarly to $M_2$. All output lines from $M_1$ except line No. 50 are connected through a switch to a multiple-input "Nor" circuit NC, which produces an output pulse only if all of the input lines are inactive; the output of the "Nor" circuit and the signal from the output line No. 50 are fed to an "And" circuit AC, which produces an output when, and only when, line No. 50 has an output and the "Nor" circuit has an output; R represents a response mechanism triggered by the signal from the "And" circuit.

A description of the explosives signalling device and how the present assembly operates to determine and indicate the difference between periods of a pair of pressure pulse sequences received at a location non-normal to said device, with particular reference to the circuitry depicted in FIGS. 1, 2, and 3 now follows.

The explosives assembly for producing a pair of pressure pulse sequences the difference in whose periods is determined by the assembly of this invention is comprised of two longitudinal arrays of explosive elements in a straight line equally spaced from each other a distance at least sufficient to prevent detonation from propagating between elements by influence, the elements in both arrays being connected in sequence by a detonation-transmitting means providing identical time intervals between the detonation of successive elements, and initiation of explosive elements in the assembly occurring at those elements, one from each array, which lie nearest to, or furthermost from, each other, the arrays being so disposed one to the other that the straight lines formed by the two arrays are parallel to the same line and that the straight line formed by one array is not intersected by a line normal to the straight line formed by the other array. The explosive elements may be single point charges or finite segments of a linear charge. For example, the array of explosive elements may be comprised of a series of aligned point charges connected in sequence by a detonation-transmitting means; or the array may be comprised of a linear charge uniformly coiled or bent, e.g., in the form of a zig-zag or a helix, so that finite segments of the linear charge in the bends or turns are spaced apart in straight-line arrangement, the segments in any straight line forming explosive elements and being connected in sequence by the portions of the linear charge between the aligned elements.

In a linear array of spaced explosive elements, such explosive element is the center of a pressure front, and a pressure gauge placed at any selected position from such an array will register the arrival of pressure from successive elements as a succession of pressure pulses, the time interval between the arrival of successive pulses, or the period of the pulse sequence, depending on the spacing between explosive elements and the time interval between detonation of successive elements. Because of the axial displacement of the centers of the pressure fronts, each array is a Doppler sound source, the time between the arrival of successive pulses, i.e., the period of the pulse sequence, varying according to the angle between the receiver and the longitudinal axis of the array.

In the explosives assembly in question, both arrays have the same spacing between explosive elements and the same interval between detonations of successive elements. As a result there is the same spacing between pulse fronts emanating in a normal direction from the two arrays, i.e., the period of the pulse sequence emanating normal from both arrays is the same. This period is preselected and fixed by the spacing between elements and the nature of the detonation-transmitting means between elements. The period $T$ of the pulse sequence emanating at any other angle from such an array is given by:

$$T = T_o + (d/C) \cos \phi,$$

where $T_o$ is the period of the pulse sequence emanating in a normal direction from the array, $d$ is the spacing between explosive elements, $C$ is the sound velocity in the medium, and $\phi$ is the angle between the direction from the sound source to the observer and the longitudinal axis of the array. In the described two-array assembly, because the two arrays are initiated at opposite ends relative to one another, the axial displacement of pulse centers is in opposite directions in the arrays with the result that there are two parallel detonation trains travelling in opposite directions from each other. At any observation point from the assembly, two pulse sequences $a$ and $b$ are received having periods $T_a$ and $T_b$, respectively. When the observation point is normal to the axes of the arrays, $T_a$ and $T_b$ are each equal to $T_o$. At other angles from the arrays, the period of the pulse sequence $a$ emitted by charge elements initiated in a sequence travelling in a direction away from the observer is $$T_a = T_o + (d/C) \cos \phi$$

and the period of the pulse sequence $b$ emitted by charge elements initiated in a sequence travelling in an opposite direction from the initiation sequence producing $a$ and parallel thereto is $$T_b = T_o + (d/C) \cos (180°-\phi) = T_o - (d/C) \cos \phi$$

Subtracting the two periods:

$$T_a - T_b = T_o + (d/C) \cos \phi - T_o + (d/C) \cos \phi$$
$$T_a - T_b = 2[(d/C) \cos \phi].$$

Since $d$ and $C$ are constant, if the difference between the periods of a pair of pressure pulse sequences received can be determined, $\phi$ can be calculated. $(T_a - T_b)$ and $(T_b - T_a)$ are determined by the assembly of the present invention.

The frequencies passed by the filters in the comb filter shown in FIG. 1 are selected on the basis of the known periods of any two pulse sequences expected to emanate at any angle from the above-described explosives assembly. The normal period is known, being fixed by the known geometry of the arrays. The center filter, No. 25, passes a frequency corresponding to this normal period. The periods $T_a$ and $T_b$ of a pair of pulse sequences expected at other angles from the assembly is known by calculation from the above-given relationships.

Knowing the expected span of the periods of the pulse sequences emanating from the explosives assembly, the filter bank is constructed so that collectively the filters pass all frequencies expected, and that individually each filter passes a narrow band of frequencies. The number of filters $n$ used in the comb filter will vary depending on the period span of the pulse sequences emitted by the acoustic source and on how narrow a filter band width is desired. The minimum band width used will depend on the band width of the transmitted signal and will be comparable thereto. The filters are so arranged that their center frequencies provide equal period increments $\Delta t$ between successive filters, the period corresponding to the lowest center frequency being $T$, and the periods corresponding to the successively higher center frequencies of successive filters being $T - \Delta t, T - 2\Delta t, ... T - (n-1)\Delta t$. For example, if the explosive sound source is known to emit pulse sequences of a minimum period of 0.075 millisecond and a maximum period of 0.125 millisecond, the center frequencies of the eleven filters numbered 20 through 30 in FIG. 1 will be such that $\Delta t$ will be 0.005 millisecond, $T$ will be 0.125 millisecond, and $T-(n-1)\Delta t$ will be 0.075 millisecond. If filter No. 30 has the lowest center frequency of the filter bank, the periods corresponding to the center frequencies passed by filters No. 20 through 30 in consecutive order will be 0.075, 0.080, 0.085, 0.090, 0.095, 0.100, 0.105, 0.110, 0.115, 0.120, and 0.125 millisecond. Therefore, in this case, the center frequencies of each of these filters will be 13.3, 12.5, 11.8, 11.1, 10.5, 10, 9.5, 9.1, 8.7, 8.3, and 8 kilocycles per second, respectively.

Using the apparatus shown in FIG. 1 as an example, the number of filters $n$ is 11. Therefore, the number of output conductors in the core matrix will be 10, i.e., one output conductor for each difference between periods corresponding to the center frequencies of the eleven filters. Based on the values of $T$ and $\Delta t$ given above as an example, a different output conductor from the core matrix will link all cores located at the intersection of two conductors leading from two core-driving amplifiers on the same channel as two filters whose center frequencies correspond to periods which differ by 0.005, 0.010, 0.015, 0.020, 0.025, 0.030, 0.035, 0.040, 0.045, and 0.050 millisecond. In the core matrix shown in FIG. 2, these output conductors are the read-out windings numbered 1 through 10, respectively.

For purposes of illustration of the operation of the assembly of FIG. 1, it will be assumed that the assembly is situated underwater at an unknown angle non-normal to the longitudinal axis of the pressure-pulse-producing explosives assembly described above, that the explosives assembly has been initiated, and that two pressure pulse sequences have been produced therefrom. These pulse sequences, as well as other signals which may be present, arrive at the hydrophone, which converts the pressure impulses to electrical impulses. The signals are then amplified in the line amplifier having an automatic gain control whose level is set so that the average input level to the Schmitt triggers is below the trigger level. The amplified signals are then sent to the comb filter. The AC signals from the filters are converted to DC signals in the integrating detectors, and the signals from the latter are fed to the Schmitt triggers whose trigger level is set sufficiently high that the intensity level of ambient noise in the ocean is insufficient to cause an output signal to be produced therefrom. Accordingly, while any of the filters may be excited by ambient noise in the ocean, the signals produced thereby will not be intense enough to produce an output on the Schmitt triggers. However, inputs to two Schmitt triggers connected via the integrating detectors to two filters excited as a result of the reception of the pair of pulse sequences emitted by the explosives assembly will be intense enough to produce outputs.

The outputs from the triggers are fed to the core-driving amplifiers, which in turn apply "one-half current" levels to their associated X and Y inputs to the matrix. If, for example, the excited filters are filters No. 23 and 27, "one-half current" levels will be applied to the No. 23 and 27 X and Y inputs. These "one-half currents" meet at four places in the matrix (i.e., at X(23), Y(23); X(27), Y(27); X(23), Y(27); and X(27), Y(23)), but only two of these locations have cores. These are X(23), Y(27) and X(27), Y(23). These two cores are then "set," or their magnetic state or saturation is reversed.

The "set" matrix is reset by means of the read-out reset winding, which is wound so as to link all cores in the same direction. This winding is pulsed periodically, e.g., by a free-running clock and driver mechanism, so that any cores that have been set since the last clock pulse are reset to their initial state. Since cores X(23), Y(27) and X(27), Y(23) have been set, these cores will be reset and will cause an output pulse on their output signal line, No. 4. This output line links all cores located at the intersection of two conductors leading from two core-driving amplifiers on the same channel as any two filters whose center frequencies correspond to periods which differ by $4\Delta t$, i.e., 0.020. The output pulse on line No. 4 actuates response mechanism No. 4, which is labelled appropriately so that the difference between periods can be recognized. This recognition can be made by various means. For example, the differences in periods, $\Delta t$, $2\Delta t$, etc., can be shown on the response mechanisms, or a numbering or a lettering code may be used to indicate the differences. The response mechanism may be of the visual or auditory type; e.g., a light may turn on or a bell may ring as a result of the actuation of the mechanism. As an alternative means of recognition, instead of labelling the mechanisms with a number or letter, each mechanism may produce a different visual or auditory response, e.g., different colored lights or coded bell signals. When a direct recognition is desired of the angle $\phi$ between the hydrophone and the longitudinal axis of the explosives assembly, $\phi$ can be calculated for $\Delta t$, $2\Delta t$, ... $(n-1)\Delta t$, and the response mechanisms labelled with the angles calculated.

For underwater communications purposes, it is essential that the period-subtracting operation be performed on the pressure pulse sequences emitted by the acoustic source. Since there is a possibility that other signals may be received which have an intensity level above the trigger level of the Schmitt triggers, and consequently that a response mechanism may be actuated by a signal other than that emitted by the explosives assembly, the present assembly will generally be used in conjunction with a detection assembly which produces a signal upon reception of only the pair of pulse sequences emitted by the explosives source.

An assembly for automatically detecting the presence of a pair of pressure pulse sequences produced by an explosives assembly as described above has recently been found. The detection is based on a controllable property of the explosives assembly which is independent of the angle of orientation of the receiver with respect to the observer. If the periods $T_a$ and $T_b$ of two pressure pulse sequences $a$ and $b$ received at an observation point from the explosives assembly are added together:

$$T_a + T_b = T_o + (d/C) \cos \phi + T_o - (d/C) \cos \phi$$
$$T_a + T_b = 2 T_o$$

we find that the sum of these periods is independent of the angle of orientation of the receiver from the assembly, and is equal to twice the period of the pulse sequence emanating normal from the longitudinal axis of either array. The recently discovered detection assembly provides a means for automatically detecting a pair of pressure pulse sequences which together have this property. The automatic detection assembly has several components in common with, and coupled the same as in, the assembly of the present invention, i.e., a pressure transducer, an amplifier with automatic gain control, a frequency separator, integrating detectors, triggering devices, and a sorting circuit, e.g., a core matrix and core-driving amplifiers. The assembly shown in FIG. 3 performs the automatic detection function and the period subtraction function and represents a combining of the present assembly with the recently discovered detection assembly. The matrix $M_1$ has 19 output conductors. Output conductor No. 50 carries an output signal when signals are received which were passed by two filters whose center frequencies correspond to periods which add up to twice the period corresponding to the center frequency of filter No. 25 (this being the period of the sequence emanating normal from the explosives array). Since at any location from the explosives array, the two pressure pulse sequences have periods whose sum is twice the normal period, an output on line No. 50 indicates the reception of two such sequences. Output signals on the other lines of $M_1$ indicate the reception of pulse sequences not having the total period sought.

Assuming, as before, that filters No. 23 and 27 are excited by reception of the two pulse sequences to be detected, the inputs to the Schmitt triggers connected via the integrating detectors to filters No. 23 and 27 will be intense enough to produce outputs. Other Schmitt triggers also may produce outputs, but these signals will not satisfy the necessary total period requirement as is determined by the sorting and logic circuit. The outputs from the triggers are fed to the core-driving amplifiers, which apply "one-half current" levels to the No. 23 and NO. 28 X and Y inputs to matrices $M_1$ and $M_2$ (and to other X and Y inputs if signals of sufficient intensity and different periods have been received). The operation of $M_2$ and its associated response circuit is as has been described with reference to FIG. 2. $M_1$ also will have cores at X(23), Y(27) and X(27), Y(23). These cores lie on the output line No. 50, and their resetting will cause an output pulse on this line.

The outputs from all of the output signal lines from $M_1$ are fed into the input lines of the logic circuit depicted in FIG. 3. A switch connects these input lines, with the exception of line No. 50, to a multiple-input "Nor" circuit, which produces an output pulse only if all of the connected input lines are inactive. The output of the "Nor" circuit and the pulse from the input line No. 50 are fed to the "And" circuit, which then produces an output. If the coded signal is the only signal received having the intensity level expected from the coded system, an output signal is produced which actuates the response mechanism. A response in this mechanism assures that a response in mechanisms 1 through 10 from $M_2$ has been produced by reception of the signals emitted by the explosives assembly. If other signals reach the logic circuit, no output signal is produced from the $M_1$ circuit.

The wiring of the core matrix can be accomplished in any convenient manner. Modifications other than those shown in FIG. 2 will occur to those skilled in the art.

Alternative to the core matrix in the sorting circuit, other devices known to the art may be employed, for example, a diode matrix.

The method of packaging the present assembly does not constitute a part of this invention. Any suitable method known to the art for packaging electrical components aboard a submarine, or surface- or aircraft will be used for all of the elements of the assembly except the hydrophone, which is located in the water.

The explosives assembly for producing pulse sequences sorted by the present assembly is described in detail in co-pending application Ser. No. 219,340 filed Aug. 24, 1962. The assembly for automatically detecting these pulse sequences is described in co-pending application Ser. No. 219,341 filed Aug. 24, 1962.

The invention has been described in detail in the foregoing. Many modifications will be apparent to those skilled in the art and will not require departure from the spirit of this invention. Accordingly, we intend to be limited only by the following claims.

We claim:

1. An assembly for determining and indicating the difference between the periods of a pair of pressure pulse sequences received by a pressure pulse receiver situated in the ocean at a location non-normal to a longitudinal array of spaced explosive elements detonated in the ocean in a manner such as to form two parallel detonation trains travelling in opposite directions relative to each other, the period of each pressure pulse sequence received at any angle from said array varying according to said angle and being the same at a normal angle to said array, the periods of pressure pulse sequences expected to be received at different angles from said array being known, and the difference between periods of a pair of pressure pulse sequences received at any angle from said array being equal to $2(d/C)\cos \phi$, where $d$ is the distance between explosive elements in said array, $C$ is the speed of sound in water, and $\phi$ is the angle between the receiver and the longitudinal axis of said array, which assembly comprises a. a pressure transducer;
b. an amplifier with automatic gain control coupled to said pressure transducer;
c. a frequency separator coupled to said amplifier and having $n$ frequency-band elements each of which passes a narrow band of frequencies, said frequency-band elements collectively passing all frequencies expected at all angles from said array and being so arranged that their center frequencies provide equal period increments $\Delta t$ between successive frequency-band elements, the period corresponding to the lowest center frequency being $T$, and the periods corresponding to the successively higher center frequencies of successive elements being $T - \Delta t$, $T - 2\Delta t$, .....$T - (n-1) \Delta t$;
d. an integrating detector coupled to each of said frequency-band elements;
e. a triggering device coupled to each integrating detector;
f. a sorting circuit coupled to said triggering devices, said sorting circuit having a plurality of conductors for carrying an output signal therefrom when signals are received from at least two different triggering devices, the number of said conductors being equal to the number $n$ of said frequency-band elements in said frequency separator less one, one of said conductors carrying an output signal when the signals received are from two different frequency-band elements whose center frequencies correspond to periods which differ from each other by $\Delta t$, another by $2\Delta t$, etc. through $(n-1) \Delta t$;
g. a multi-response circuit having $(n-1)$ response mechanisms each coupled to one output conductor from said sorting circuit, wherein $n$ is as defined above.

2. An assembly for automatically detecting and determining the difference between the periods of a pair or pressure pulse sequences received by a pressure pulse receiver situated in the ocean at a location non-normal to a longitudinal array of spaced explosive elements detonated in the ocean in a manner such as to form two parallel detonation trains travelling in opposite directions relative to each other, the periods of the pair of pressure pulse sequences received at any angle from said array varying according to said angle and being the same at a normal angle to said array, the periods of the pressure pulse sequences expected to be received at different angles from said array being known, the pair of pressure pulse sequences received at any angle from said array having periods whose sum is twice the period of the pulse sequences emanating normal from said arrays and whose difference is equal to $2(d/C)\cos \phi$ where $d$ is the distance between explosive elements in said array, $C$ is the speed of sound in water, and $\phi$ is the angle between the receiver and the longitudinal axis of said array, which assembly comprises a. a pressure transducer;
b. an amplifier with automatic gain control coupled to said pressure transducer;
c. a frequency-separator coupled to said amplifier and having n frequency-band elements each of which passes a narrow band of frequencies, said frequency-band elements collectively passing all frequencies expected at all angles from said array and being so arranged that their center frequencies provide equal period increments $\Delta t$ between successive frequency-band elements, the period corresponding to the lowest center frequency being $T$, and the periods corresponding to the successively higher center frequencies of successive elements being $T- \Delta t$, $T-2\Delta-(n-1)\Delta t$;
d. an integrating detector coupled to each of said frequency-band elements;
e. a triggering device coupled to each integrating detector;
f. a first sorting circuit coupled to said triggering devices, said sorting circuit having a plurality of conductors adapted to carry an output signal therefrom when signals are received from at least two different triggering devices, the number of said conductors being equal to $2n-3$, $n$ being as defined above, one of said conductors carrying an output signal when signals have been passed by two different frequency-band elements whose center frequencies correspond to periods which add up to one sum, another to a different sum, etc., for all possible sums;
g. a second sorting circuit coupled to said triggering devices, said sorting circuit having a plurality of conductors for carrying an output signal therefrom when signals are received from at least two different triggering devices, the number of said conductors being equal to $n-1$, $n$ being as defined above, one of said conductors carrying an output signal when the signals received are from two different frequency-band elements whose center frequencies correspond to periods which differ from each other by $\Delta t$, another by $2\Delta t$, etc. through $(n-1)\Delta t$;
h. a logic circuit coupled to said first sorting circuit, said logic circuit being adapted to produce an electrical impulse signal upon reception of (1) an output signal from an output conductor carrying a signal when signals have been passed by two frequency-band elements whose center frequencies correspond to periods which add up to twice the period of the pulse sequences emanating normal from said explosives array, and (2) signals from no other output conductors; and
i. a multi-response circuit coupled to said second sorting circuit, said multi-response circuit having $(n-1)$ response mechanisms each coupled to one output conductor from said second sorting circuit, $n$ being as defined above.

3. An assembly for determining and indicating the difference between the periods of a pair of pressure pulse sequences received by a pressure pulse receiver situated in the ocean at a location non-normal to a longitudinal array of spaced explosive elements detonated in the ocean in a manner such as to form two parallel detonation trains travelling in opposite directions relative to each other, the period of each pressure pulse sequence received at any angle from said array varying according to said angle and being the same at a normal angle to said array, the periods of pressure pulse sequences expected to be received at different angles from said array being known, and the difference between periods of a pair of pressure pulse sequences received at any angle from said array being equal to $2(d/C)\cos \phi$ where $d$ is the distance between explosive elements in said array, $C$ is the speed of sound in water, and $\phi$ is the angle between the receiver and the longitudinal axis of said array, which assembly comprises a. a hydrophone;
b. an amplifier with automatic gain control coupled to said hydrophone;
c. a comb filter coupled to said amplifier and having $n$ filters each of which passes a narrow band of frequencies, said filters collectively passing all frequencies expected at all angles from said array and being so arranged that their center frequencies provide equal period increments $\Delta t$ between successive filters, the period corresponding to the lowest center frequency being $T$, and the periods corresponding to the successively higher center frequencies of successive filters being $T-\Delta t$, $T-2\Delta t$,...$T-(n-1)\Delta t$;
d. an integrating detector coupled to each of said filters;

e. a Schmitt trigger coupled to each integrating detector and having a trigger level above the ambient noise level of the ocean;

f. a core-driving amplifier coupled to each Schmitt trigger;

g. a core matrix coupled to said core-driving amplifiers, said core matrix having a plurality of conductors adapted to carry an output signal therefrom when signals are received from at least two different core-driving amplifiers, the number of said conductors being equal to the number $n$ of said filters in said comb filter less one, one of said conductors carrying an output signal when the signals received are from two different filters whose center frequencies correspond to periods which differ from each other by $\Delta t$, another by $2\Delta t$, etc. through $(n-1)\Delta t$; and h. a multi-response circuit having $(n-1)$ response mechanisms each coupled to one output conductor from said core matrix, where $n$ is as defined above.

4. An assembly according to claim 3, wherein an astable multivibrator is coupled to each Schmitt trigger and to each core-driving amplifier thereby replacing the coupling of each Schmitt trigger with a core-driving amplifier.

* * * * *

PO-1050
(5/69)

UNITED STATES PATENT OFFICE
CERTIFICATE OF CORRECTION

Patent No. 3,660,808   Dated May 2, 1972

Inventor(s) Kern M. Bowyer and David L. Coursen

It is certified that error appears in the above-identified patent and that said Letters Patent are hereby corrected as shown below:

Column 9, line 49, "or" should be --of--.

Column 10, line 6 should read --$T - 2\Delta T,\ldots T - (n-1)\Delta t$;--

Signed and sealed this 12th day of September 1972.

(SEAL)
Attest:

EDWARD M. FLETCHER, JR.
Attesting Officer

ROBERT GOTTSCHALK
Commissioner of Patents